(12) United States Patent
Duraj

(10) Patent No.: US 8,158,947 B2
(45) Date of Patent: Apr. 17, 2012

(54) ACTIVE VOLTAGE DIVIDER FOR DETECTOR

(75) Inventor: Artan Duraj, Sevin Hills, OH (US)

(73) Assignee: Saint-Gobain Ceramics & Plastics, Inc., Worcester, MA (US)

( * ) Notice: Subject to any disclaimer, the term of this patent is extended or adjusted under 35 U.S.C. 154(b) by 154 days.

(21) Appl. No.: 12/495,347

(22) Filed: Jun. 30, 2009

(65) Prior Publication Data

US 2010/0288933 A1    Nov. 18, 2010

Related U.S. Application Data

(60) Provisional application No. 61/078,079, filed on Jul. 3, 2008.

(51) Int. Cl.
    *G01T 1/208* (2006.01)
(52) U.S. Cl. .................. 250/361 R; 250/207; 313/533
(58) Field of Classification Search ............ 313/533, 313/532, 103 R, 104, 105 R; 250/207, 361 R
See application file for complete search history.

(56) References Cited

U.S. PATENT DOCUMENTS

| 5,512,755 | A  | * | 4/1996 | Vickers et al. | ............ | 250/363.09 |
| 7,005,625 | B1 | * | 2/2006 | Mitchell | ............... | 250/207 |

FOREIGN PATENT DOCUMENTS

| JP | 10-337619    | 12/1998 |
| JP | 2003-510712  | 3/2003  |
| JP | 2004-248374  | 9/2004  |

OTHER PUBLICATIONS

International Search Report and Written Opinion dated Mar. 5, 2010 issued in corresponding PCT Application No. PCT/US09/049257, 10 pages.
Photon is our Business, Photomultiplier Tubes—Basics and Applications, Third Edition, Hamamastu Photonics K. K., 2006, 324 pages, Feb. 2006.

* cited by examiner

*Primary Examiner* — Constantine Hannaher
(74) *Attorney, Agent, or Firm* — Abel Law Group, LLP; Robert T. Conway

(57) ABSTRACT

A voltage divider for supplying a photomultiplier. The voltage divider may include a plurality of active circuits, each of the active circuits configured to establish divided voltage levels at separate ports of a photomultiplier.

13 Claims, 3 Drawing Sheets

ACTIVE VOLTAGE DIVIDER FOR DETECTOR

CROSS REFERENCES TO RELATED APPLICATIONS

This application claims the benefit of the filing date of U.S. Provisional Application Ser. No. 61/078,079, filed Jul. 3, 2008, which is hereby fully incorporated by reference.

STATEMENT REGARDING FEDERALLY SPONSORED RESEARCH OR DEVELOPMENT

None.

REFERENCE TO SEQUENTIAL LISTING, ETC.

None.

FIELD OF THE INVENTION

The present disclosure relates to scintillation detectors and, more specifically, to a voltage divider that may be used with scintillation detectors.

BACKGROUND

Scintillation detectors may be utilized for assessing or measuring radiation, including, for example, gamma rays, low and high energy X-rays, electrons, positrons and neutrons. Scintillation detectors may be used in a number of applications including well logging in the oil and gas industry to various medical applications such as positron emission tomography (PET) scanning and cobalt treatments. Generally, the detectors may include a crystal, which converts the energy of radiation to a light pulse. The light pulse may then be detected using a photomultiplier or other photodetector that converts the light pulses to electrical signals, e.g. at a photocathode. A photomultiplier may include intermediate dynodes that may amplify the electrical signals and an anode for outputting the amplified electrical signal. The photomultiplier may be powered by a relatively high voltage that may be divided a voltage divider and delivered to the dynodes.

SUMMARY OF THE INVENTION

An aspect of the present disclosure relates to a voltage divider for a scintillation detector. The voltage divider may include a plurality of active circuits, each of the active circuits including at least one associated resistor configured to establish an associated divided voltage for the active circuit, and at least two transistors configured to supply a first port voltage to the photomultiplier, wherein the first port voltage is based on the associated divided voltage.

Another aspect of the present disclosure relates to a method for constructing a scintillation detector, the method including: configuring a voltage divider circuit for dividing a supply voltage into a plurality of associated divided voltages, wherein each one of the plurality of associated divided voltages is based on an associated nominal value of an associated resistor, and providing at least one of the plurality of associated divided voltages to at least one arrangement of at least two associated transistors, wherein the transistors are configured to supply a first port voltage to an associated one of a plurality of ports of the photomultiplier; and coupling the voltage divider circuit to a photomultiplier.

Yet another aspect of the present disclosure relates to a scintillation detection system. The system may include a scintillation crystal; a photomultiplier in optical communication with the scintillation crystal; a voltage divider coupled to the photomultiplier, and an analyzer coupled to the photomultiplier. The voltage divider may include a plurality of active circuits, each of the active circuits including: at least one associated resistor configured to establish an associated divided voltage for the active circuit, and at least two transistors configured to supply a first port voltage to the photomultiplier, wherein the first port voltage is based on the associated divided voltage.

BRIEF DESCRIPTION OF THE DRAWINGS

The above-mentioned and other features of this disclosure, and the manner of attaining them, may become more apparent and better understood by reference to the following description of embodiments described herein taken in conjunction with the accompanying drawings, wherein.

DETAILED DESCRIPTION

Figure 1:
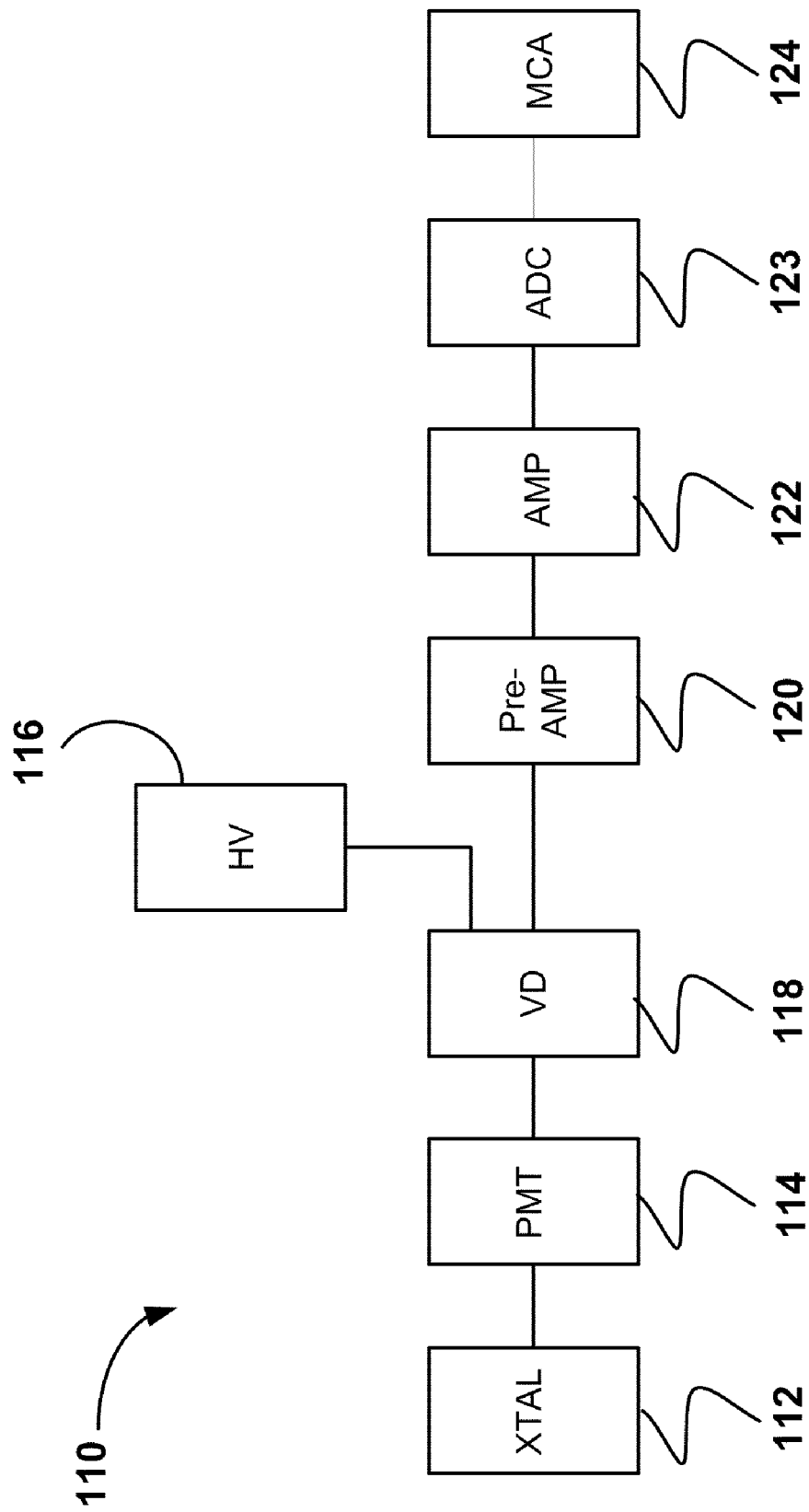
FIG. 1 is an example of a scintillation detection system.

It is to be understood that this disclosure is not limited in its application to the details of construction and the arrangement of components set forth in the following description or illustrated in the drawings. The embodiments herein are capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted," and variations thereof herein are used broadly and encompass direct and indirect connections, couplings, and mountings. In addition, the terms "connected" and "coupled" and variations thereof are not restricted to physical or mechanical connections or couplings.

The present disclosure relates to a voltage divider for use with a scintillation detector. As noted above, a scintillation detector may be used to assess or measure radiation by converting the energy of the radiation into light pulses or photons. The radiation may be electromagnetic, i.e., in the form of waves or photons, such as gamma rays, low and high energy X-rays, etc. The radiation may also be particle radiation, i.e., in the form of sub-atomic particles, including electrons, positrons or neutrons. The scintillation detector may convert the light pulses or photons into electrical energy and amplify the electrical energy, e.g. in a photomultiplier.

The photomultiplier may include a cathode that may receive the light pulse or photon and may convert the light energy to electrical energy, a plurality of dynodes that may amplify the electrical energy and an anode for outputting the amplified electrical energy. The photomultiplier may be biased with a relatively high voltage. A voltage divider may divide the relatively high voltage and may provide the divided voltages to the photomultiplier dynodes. The gain of the photomultiplier may depend on the voltage and current supplied by the voltage divider. As may be appreciated, gain linearity in the scintillation detector may provide more accurate assessments or measurements of radiation.

An example of a scintillation detection system is illustrated in FIG. 1. The detector 110 may include a scintillation crystal 112, which may absorb radiation and scintillate or emit a portion of the absorbed energy as photons. Examples of relatively common scintillation crystals may include thallium doped sodium iodide (NaI(Tl)) or thallium doped cesium iodide (CsI(Tl)). Additional examples of scintillation crystals may include barium fluoride, cerium-doped lanthanum chloride ($LaCl_3(Ce)$), bismuth germinate ($Bi_4Ge_3O_{12}$), cerium-doped yttrium aluminum garnet (Ce:YAG), cerium-doped lanthanum bromide ($LaBr_3(Ce)$), lutetium iodide ($LuI_3$), terbium-doped gadolinium oxysulfide (GOS(Tb)), calcium tungstate ($CaWO_4$), cadmium tungstate ($CdWO_4$), lead tungstate ($PbWO_4$), zinc tungstate ($ZnWO_4$) or lutetium oxyorthosilicate ($Lu_2SiO_5$). The emitted photons may then be detected by a photodetector 114, which is in optical communication with the crystal.

In one example, the photodetector 114 may be a photomultiplier tube (PMT). As photons emitted from the crystal strike a photocathode within the photomultiplier tube, electrons may be generated producing a signal representative of the incident radiation absorbed by the scintillation crystal. The photomultiplier 114 may be biased by a high voltage power supply 116, which connects to a voltage divider 118. The voltage divider 118 may divide the high voltage into a series of steps to accelerate the electrons from one photomultiplier stage to the next. The photomultiplier may multiply or amplify the signal produced by at least a few orders of magnitude, such as in the range of $10^2$ to $10^8$. Other photodetectors 114 may include photodiodes or charge-coupled devices. The signal provided by the photodetector 114 may then be processed by a pre-amplifier (Pre-Amp) 120 and an amplifier 122, an analog to digital converter (ADC) 123 and then by a multi-channel analyzer (MCA) 124 to which the photodetector 114 may be in electrical communication. In one example, the pre-amplifier may amplify or increase the signal received from the photodetector and the amplifier may shape or filter the signal received from the pre-amplifier. However, it may be appreciated that other arrangements may be utilized herein as well.

Figure 2:
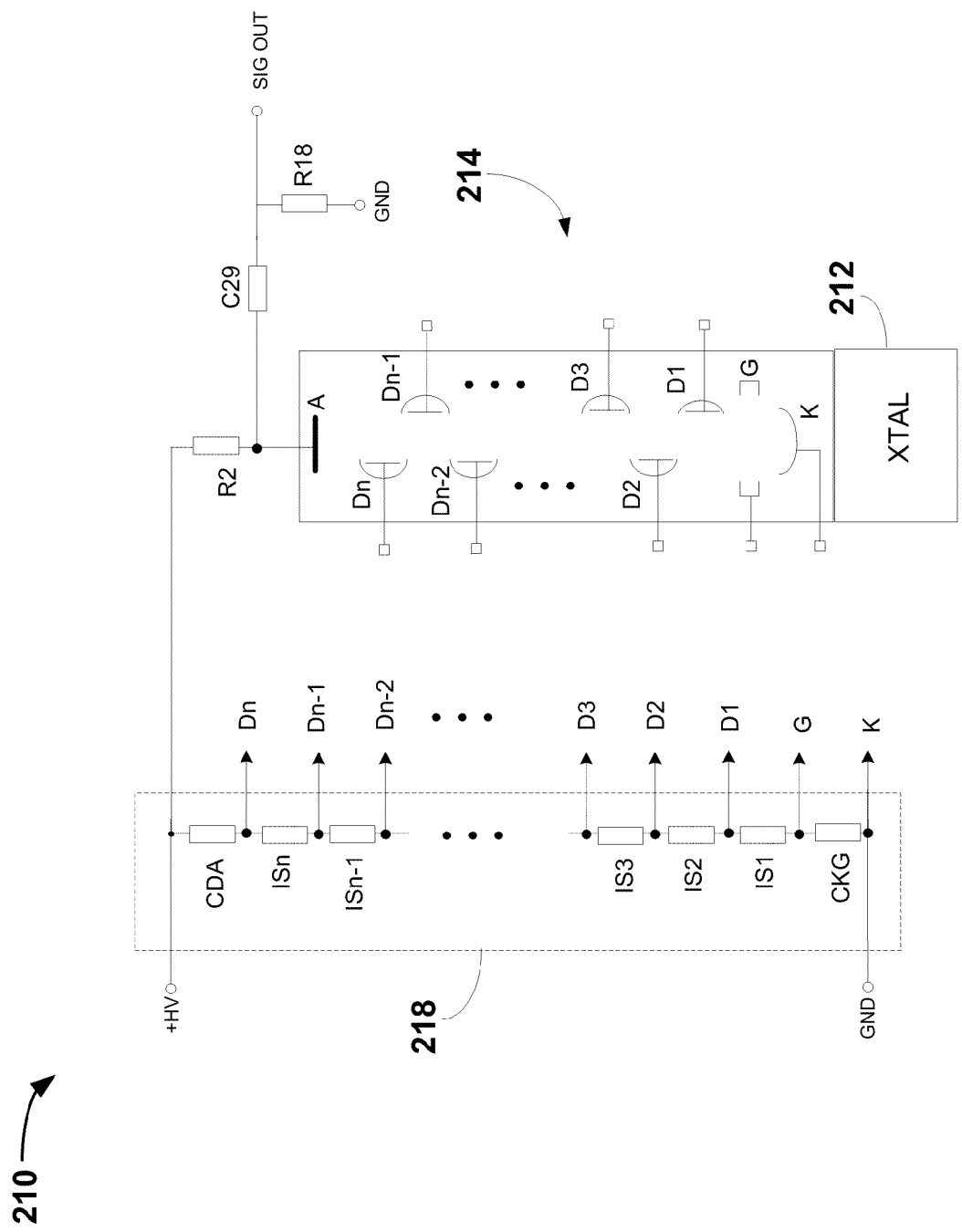
FIG. 2 is a functional block diagram of a portion of a scintillation detection system, including a crystal, photomultiplier, voltage divider and detection circuitry.

FIG. 2 depicts an example of a functional block diagram of a portion 210 of the scintillation detection system illustrated in FIG. 1. The portion 210 may include a scintillation crystal 212, a photomultiplier 214 (e.g., a photomultiplier tube) and a voltage divider circuit 218. As discussed above, a scintillation detection system may include a crystal (XTAL) that may absorb radiation and emit a portion of the absorbed energy as photons. The photons may be converted to electrical energy (e.g., electrons) that may then be amplified in the photomultiplier 214. The photomultiplier may include a plurality of dynodes for amplifying the electrons. There are a number of types of photomultipliers. The photomultiplier type may depend on a particular configuration of the plurality of dynodes, e.g., structure and/or number.

In the photomultiplier 214, the photons may be converted to electrons by a photocathode K. The electrons may then be focused by a focusing grid that may be coupled to focusing grid port G. The focused electrons may then be received by a first dynode D1, in a series of dynodes (stages) D1-Dn. Each successive dynode D2-Dn may receive one or more electrons from a prior dynode, may generate a plurality of secondary electrons for each received electron which may in turn be received by the next dynode in the series. For example, the number of secondary electrons produced per incident electron may be in the range of four to five. The process may be repeated through the nth dynode Dn. The secondary electrons produced by dynode Dn may be received by the anode and may then flow out of the PMT. The output current may be provided to a load resistor, e.g., R18. A resulting voltage across the load resistor R18 may then be provided to detection circuitry, e.g., pre-amplifier 120, amplifier 122, ADC 124 and MCA 124.

As illustrated in FIG. 2, the cathode K may be grounded and a positive voltage may be provided, through resistor R2 to the anode A. In this configuration, a coupling capacitor C29 may be included to block a DC supply voltage HV from transmission to the preamplifier 120 and other signal processing circuitry. The anode current may then be supplied to a load resistor R18, producing a voltage output signal SIG OUT. This configuration may be used, for example, for scintillation detection. It may be appreciated that, alternatively, the anode A may be coupled to ground through a load resistor and a negative voltage coupled to the cathode K. The DC blocking capacitor C29 may then be excluded.

It may be appreciated that for a dynode to produce secondary electrons, the dynode must first receive an incident electron. Dynode D1, as the first dynode in the series, may be provided the fewest incident electrons, i.e., electrons produced by photocathode K and focused by the focusing grid. Accordingly, the likelihood that an electron produced by the photocathode K reaches dynode D1 is an important factor in the ability of the PMT to multiply. Collection efficiency may be defined as the probability that an electron will be received in an effective area of a dynode D1. Effective area may be understood to mean an area of a dynode that may, upon receipt of an incident electron, produce secondary electrons whose trajectories allow them to land on the effective areas of later dynodes in the series. In other words, electrons not received in the effective area may not produce secondary electrons and so may not contribute to multiplication. The collection efficiency of dynode D1 may depend on a voltage between the cathode K and the first dynode D1. If this voltage is too low, the collection efficiency of D1 may be decreased.

As illustrated in FIG. 2, a photomultiplier tube may include a plurality of dynodes. For example, a photomultiplier tube may include eight dynodes. In another example, a photomultiplier tube may include ten dynodes. As discussed above, each dynode may effectively multiply an electron by factor of four or five. Accordingly, a ten dynode PMT may provide a current gain between the cathode K and anode A of about $10^6$. Gain may be understood to mean a ratio of current at the anode A to current at the cathode K. The gain may depend on the collection efficiency of dynode D1 as well as a multiplication factor (number of secondary electrons emitted per incident electron received, i.e., secondary emissions ratio) of the intermediate dynodes D2-Dn. The multiplication factor may depend on an interstage voltage of a dynode, i.e., a voltage between a dynode and the preceding dynode in the series. For example, the interstage voltage of dynode D2 may be the voltage across interstage circuit IS2, i.e., the voltage between dynode D1 and dynode D2. If the interstage voltage is decreased, the multiplication factor of a dynode may be decreased, thereby decreasing the net gain of the photomultiplier. This may mean that the output signal may be relatively low so that, for adequate detection, further amplification by the preamplifier 120 and/or amplifier 122 may be necessary. This may decrease a signal-to-noise ratio of the scintillation detection system 110 as an amplifier may be relatively noisier than a photomultiplier.

A photomultiplier may include another source of nonlinearity when detecting relatively high intensity inputs. This nonlinearity may be due to space charge effects in dynodes closer to the anode A, e.g. dynode Dn. It may be appreciated that each dynode is configured to amplify (multiply) incident electrons so that the number of electrons, i.e., current magnitude, is relatively higher at the dynodes closer to the anode A, e.g., Dn, Dn−1, Dn−2. Space charge effects between dynodes may inhibit further multiplication resulting in gain saturation, i.e., the output current may not increase with increased cathode current. Saturation current level may depend on anode and dynode structure and/or interstage voltage. Gain saturation may be reduced (i.e., saturation current may be increased), by increasing the interstage voltages for dynodes near the anode A, e.g., Dn, Dn−1, Dn−2.

Supply voltage +HV and voltages applied across ports of a photomultiplier may be important parameters in the operation (i.e., collection efficiency, gain and/or linearity) of the photomultiplier. Ports of a photomultiplier may include cathode K, focusing grid port G, dynodes D1-Dn and anode A. It may be appreciated that not all photomultipliers include an internal connection between port G and an internal focusing grid. Photomultipliers may generally be supplied by a voltage divider circuit 218. A relatively high voltage supply, e.g., 800 or 1000 volts, may be divided by a number of circuits, e.g., interstage circuits IS1-ISn, cathode to focusing grid circuit CKG and last dynode to anode circuit CDA. For example, interstage circuit IS2 may be coupled between stages (i.e., dynodes) D1 and D2. In a relatively simple configuration, i.e., a passive circuit, each circuit CKG, IS1-ISn, CDA, may be a resistor with all resistors having equal nominal values. Assuming that the anode current is relatively small, e.g., a relatively low intensity pulse is detected, the voltage across CKG, CDA and each interstage voltage may be an approximately equal fraction of the supply voltage. In this situation, current from the dynodes may be small relative to current from the power supply +HV. The gain of the photomultiplier may then be independent of the cathode current, i.e., may be linear. For relatively high intensity pulses, this approximation may no longer be accurate.

For relatively high intensity inputs, the anode and dynode currents may not be small relative to supply current. Dynode currents may then flow in the interstage circuits, e.g., IS1-ISn. These dynode currents may oppose the current provided by the voltage supply +HV. A net decreased current flow in an interstage circuit may result in a decrease in interstage voltage. Because of the multiplication at each stage (e.g., dynode), the net decreased current flow may be of higher magnitude for dynodes nearer the anode, e.g., Dn, Dn−1. As a result, interstage voltages may be relatively higher for dynodes nearer the cathode, e.g., D1, D2, and relatively lower for dynodes nearer the anode (because of the current amplification at each successive dynode). The voltage across the voltage divider circuit may be held at the power supply voltage, within the capacity of the power supply. A higher intensity input may result in a decrease in supply voltage +HV if the capacity of the power supply is exceeded. Accordingly, a detector circuit, with a resistive voltage divider may have a limited dynamic range.

Figure 3:
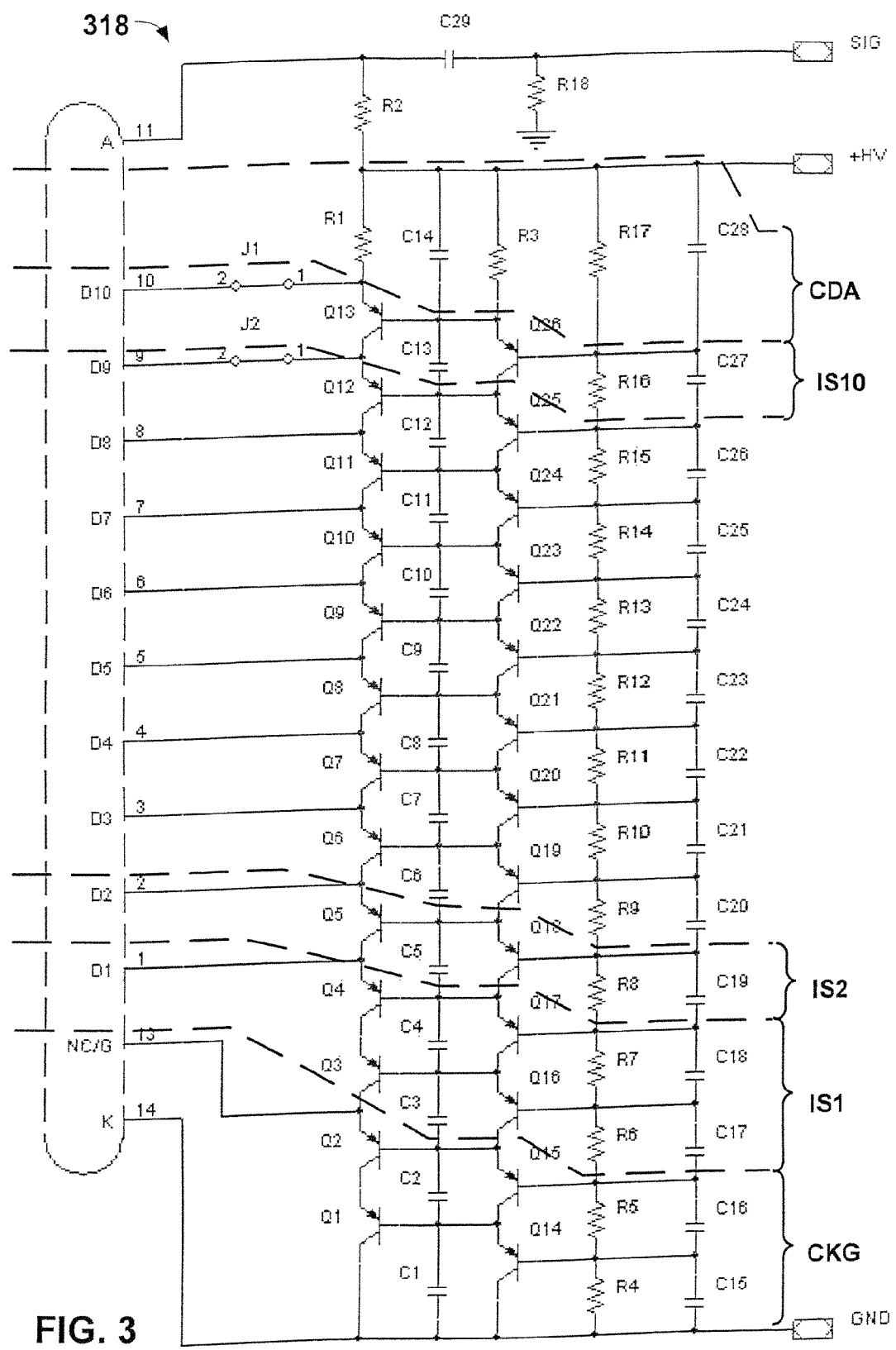
FIG. 3 depicts an illustrative schematic of an example of an active voltage divider circuit.

FIG. 3 depicts an illustrative schematic of an example of an active voltage divider circuit 318, consistent with the present disclosure that may have an increased dynamic range. In other words, the detection circuit illustrated in FIG. 1, may be capable of detecting higher intensity pulses, with a voltage divider 118, configured according to FIG. 3. The active voltage divider circuit 318 may be configured to provide improved linearity when detecting relatively high intensity pulses, e.g., in scintillation detectors. The active voltage divider circuit may preserve collection efficiency and enhance dynamic range to provide a linear output over a wider range of inputs.

FIG. 3 has been annotated to indicate an example of circuit elements that may correspond to cathode-to-grid port circuit CKG, Dn-to-anode circuit CDA, and interstage circuits IS1-ISn, depicted in FIG. 2. It may be appreciated that the active voltage divider circuit depicted in FIG. 3 is configured for a photomultiplier with, e.g., ten dynodes. The active voltage divider circuit 318 may be configured for an eight dynode photomultiplier, for example, by removing jumpers J1 and J2 and coupling interstage circuit IS8 to circuit CDA. The active voltage divider circuit 318 is not limited to photomultipliers with eight or ten dynodes. The number of interstage circuits, i.e., IS1 through ISn, may be adjusted to match the number of dynodes in a photomultiplier.

It may be appreciated that circuits CKG, CDA and interstage circuit IS1 are configured differently than interstage circuits IS2 through IS10. Each circuit may be configured according to its position relative to the cathode K and anode A. In other words, desired properties of a circuit may depend on whether the circuit is coupled between the cathode K and first dynode D1, or between the second and third dynodes D2 and D3, or between the last dynode, e.g., D10, and the anode A. For example, interstage circuit IS2 may include a first PNP bipolar junction transistor Q5. A collector of Q5 may be coupled to dynode D1. An emitter of Q5 may be coupled to dynode D2 and a base of Q5 may be coupled to an emitter of a second PNP transistor Q18. A first capacitor C5 may be coupled between the emitter and a collector of the second PNP transistor Q18. A base of the second transistor Q18 may be coupled to a resistor R8. A capacitor C19 may be coupled in parallel with R8. Interstage circuits IS3 through, e.g., IS10 may be similarly constructed.

Similarly, for example, interstage circuit IS1 may include a first and a second PNP transistor, Q1 and Q2. A collector of the first transistor Q1 may be coupled to cathode K and an output of a power supply, e.g., GND. An emitter of the first transistor Q1 may be coupled to a collector of the second transistor Q2. A base of the first transistor Q1 may be coupled to an emitter of a third transistor Q14 and a collector of a fourth transistor Q15. A base of the second transistor Q2 may be coupled to an emitter of the fourth transistor Q15. An emitter of the second transistor Q2 may be coupled to focusing grid port G. A collector of the third transistor Q14 may be coupled to the output of the power supply, e.g. GND. A first capacitor C1 may be coupled between the base and collector of the first transistor Q1. A first electrode of a second capacitor C2 may be coupled to the base of the first transistor Q1 and a second electrode of the second capacitor C2 may be coupled to the base of the second transistor Q2. A first resistor R4 may be coupled between a base and the collector of the third transistor Q14. A second resistor R5 may be coupled between the base of the third transistor Q14 and a base of the fourth transistor Q15. A third capacitor C15 may be coupled in parallel with the first resistor R4 and a fourth capacitor C16 may be coupled in parallel with a second resistor R5. Interstage circuit IS1 may be similarly constructed.

As discussed above, gain linearity of photomultipliers, e.g., photomultiplier 214, may depend on collection efficiency, multiplication factor and may be susceptible to gain saturation. These factors may depend on dynode position relative to anode and/or cathode, interstage voltage and/or supply current. The passive resistive voltage divider discussed above, with nominally equal resistor values, may not accommodate this complexity and may therefore result in a detection circuit with limited dynamic range. The illustrative active voltage divider circuit depicted in FIG. 3 may be configured to increase the dynamic range and enhance linearity.

In particular, CKG circuit, CDA circuit and interstage voltages as a fraction of supply voltage +HV may be set by resistors R4 through R17. Each resistor value may be selected according to the stage and/or photomultiplier port, e.g., focusing grid port G, that circuit is supplying. In an embodiment, resistors R4 through R7 may be selected to have values relatively larger than the values of resistors R8 through R13. As a result, the voltages between the cathode K and focusing grid port G, and the focusing grid port G and the first dynode D1, may be relatively higher than the interstage voltages between D1 and D2, D2 and D3, etc. In this manner, collection efficiency may be preserved and/or enhanced. In an embodiment, resistors R14 through R17 may be selected to have values relatively larger than the values of resistors R8 through R13 and that gradually increase from R14 to R17. In this manner, voltage gradients between dynodes closer to the anode, e.g., D10-D8, where electron density may be relatively high, may be increased. The increased voltage gradients may reduce space charge effects and thereby accommodate detection of relatively higher intensity pulses while avoiding gain saturation.

Active components, e.g., transistors, may be configured to maintain interstage voltages in the presence of dynode currents that are not orders of magnitude less than a supply current. Such dynode currents may be produced when detecting relatively high intensity pulses and may be relatively higher for dynodes closer to the anode A. In an embodiment, transistors Q1 through Q13 may be configured to receive dynode current (i.e., a flow of electrons from the dynodes) and may use this current to maintain interstage voltages. Transistors Q14 through Q26 may provide a relatively high input impedance between resistors R4 through R16 and a photomultiplier. In this manner, the active voltage divider circuit may maintain interstage voltages during detection of relatively high intensity pulses.

In an embodiment, the active voltage divider circuit 318 may further include a plurality of capacitors, e.g., capacitors C1 through C28. These capacitors C1-C28 may provide additional current when a short duration, relatively high intensity pulse may be received. A charged capacitor may contain a charge Q, where Q equals the capacitance multiplied by a voltage (constant) across the capacitor. A capacitor may supply a current, i.e., discharge, when the voltage across the capacitor decreases. The capacitors C1 through C28 may charge in between pulses, and may at least partially discharge to supply additional current when a pulse is detected. This may further enhance the dynamic range of a detection system.

It may be appreciated that the selection of component values in an active voltage divider circuit may depend on the photomultiplier 114, the crystal 112, and/or the nature of the signal being detected. For example, relative values of resistors R4 through R17 may be adjusted depending on the photomultiplier 114, the crystal 112 and/or the nature of the signal being detected. In one embodiment, resistors R4 through R7 may be 665 k$\Omega$, resistors R8 through R13 may be 510 k$\Omega$, and R14, R15, R16 and R17, may be 665 k$\Omega$, 768 k$\Omega$, 1000 k$\Omega$, and 1250 k$\Omega$, respectively. As used herein, $\Omega$ may be understood to mean ohm, so k$\Omega$ may be understood to mean kilo-ohm. Stated resistor values may be understood to be nominal resistor values where an actual resistor value may be within a tolerance, e.g., ±1%, of the stated, nominal value.

Tables 1, 2 and 3, include illustrative test data relative to energy linearity for a passive, purely resistive voltage divider, an active voltage divider for equal divided voltages, and an active voltage divider, consistent with the present disclosure, configured for a range of divided voltages. For the data, an isotope of Cesium (Cs-137), with energy level 662 keV, was used as a standard and a Cerium-doped lanthanum bromide (LaBr$_3$(5% Ce)) scintillation crystal was used. It may be appreciated that a Cerium-doped lanthanum bromide crystal may produce a relatively fast, relatively high intensity light pulse. Table 1 includes peak energy for isotopes of Cobalt (Cobalt-60) at two energy levels (1172.5 keV and 1332.5 keV), isotopes of Thorium (Th-228) and isotopes of Curium (Cm-244) and ratios of these peak energies to Cs-137. A degree of nonlinearity of a detection system may be indicated by a deviation between a detected energy ratio and the ideal ratios listed in Table 1.

TABLE 1

| Peak | Co-60 1172.5 | Co-60 1332.5 | Th-228 | Cm-244 |
|---|---|---|---|---|
| Energy | 1172.5 | 1332.5 | 2615 | 6130 |
| Ratio | 1.77 | 2.01 | 3.95 | 9.26 |

Table 2 includes detected energy ratios for an exemplary ten stage voltage divider. "Passive" may be understood to mean a purely resistive voltage divider, with substantially equal divided voltages. "Active, equal voltage" may be understood to mean an active voltage divider, configured, for example as the voltage divider depicted in FIG. 3, with substantially equal divided voltages. "Active" may be understood to mean an active voltage divider, configured, for example as the voltage divider depicted in FIG. 3. For the data shown, the voltage divider was configured to provide relatively higher divided voltages between the cathode K and focusing grid port G, and the focusing grid port G and the first dynode D1 than between intermediate dynodes D2-D8. The voltage divider was further configured to provide relatively higher voltages between dynodes D8 and D9, dynodes D9 and D10, and dynode D10 and the anode A, than between the intermediate dynodes D2-D8. The voltage divider was further configured to provide a relatively smaller voltage between dynodes D8 and D9 than the voltage applied between dynodes D9 and D10. Similarly, the voltage divider was further configured to provide a relatively smaller voltage between dynodes D9 and D10 than the voltage provided between D10 and the anode A. It may be appreciated that the active voltage divider configured according to one embodiment of the present disclosure provided improved ratios compared to the passive and/or active, equal voltages, dividers for the energies listed.

TABLE 2

| Voltage Divider | Co-60 1172.5 | Co-60 1332.5 | Th-228 | Cm-244 |
|---|---|---|---|---|
| Passive | 1.751 | 1.977 | 3.678 | 6.713 |
| Active, equal voltage | 1.753 | 1.965 | 3.609 | 6.727 |
| Active | 1.778 | 2.021 | 3.949 | 8.183 |

Table 3 includes detected energy data for an exemplary eight stage voltage divider. "Passive" and "Active, equal voltage" have the same meaning as in Table 2 with the exception that Jumpers J1 and J2 may not be present and interstage circuit IS8 may be coupled to circuit CDA, yielding an 8 stage voltage divider. "Active" has the same meaning as in Table 2 except that, without Jumpers J1 and J2, the voltage divider was further configured to provide a relatively higher voltage between dynode D8 and the anode A, than between the intermediate dynodes D2-D8. It may be appreciated that the linearity of the 8 stage configuration may not be as good as the linearity of the 10 stage configuration. However, the Active configuration relatively more closely matches the ratios listed in Table 1.

TABLE 3

| Voltage Divider | Co-60 1172.5 | Co-60 1332.5 | Th-228 | Cm-244 |
|---|---|---|---|---|
| Passive | 1.579 | 1.734 | 2.644 | 3.856 |
| Active, equal voltage | 1.665 | 1.842 | 2.968 | 4.455 |
| Active | 1.671 | 1.860 | 3.132 | 5.177 |

An active voltage divider consistent with the present disclosure may be utilized in a variety of scintillation detectors. Reference is made herein to U.S. Pat. Nos. 5,869,836; 6,222,192; 6,359,282; and U.S. Patent Application No. 2007/0007460, the disclosures of which are incorporated herein by reference, which describe a number of scintillation detectors in which the active voltage divider contemplated herein may be utilized. Furthermore, the scintillation detectors including the voltage dividers discussed herein may be employed in various applications and devices, including medical devices, geophysical devices, inspection devices, research devices and health physics applications. Medical devices may include positron emission tomography scanners, gamma cameras, computed tomography scanners and radioimmunoassay applications. Geophysical devices may include well logging detectors. Inspection devices may include radiance detectors, such as thermal neutron activation analysis detectors, luggage scanners, thickness gauges, liquid level gauges, security and manifest verification both active and passive, spectroscopy (radioisotope identification devices) both active and passive, and gross counters both active and passive. Research devices may include spectrometers and calorimeters. Health physics applications may include laundry monitoring and area monitoring.

The foregoing description of several methods and embodiments has been presented for purposes of illustration. It is not intended to be exhaustive or to limit the claims to the precise steps and/or forms disclosed, and obviously many modifications and variations are possible in light of the above teaching. It is intended that the scope of the invention be defined by the claims appended hereto.

What is claimed is:

1. A voltage divider for supplying a photomultiplier, said voltage divider comprising:
   a plurality of active circuits, each of said active circuits comprising:
      at least one associated resistor configured to establish an associated divided voltage for said active circuit; and
      at least two transistors configured to supply a first port voltage to said photomultiplier, wherein said first port voltage is based on said associated divided voltage.

2. The voltage divider of claim 1 wherein a first one of said associated resistors associated with a first one of said active circuits has a different nominal resistance than a second one of said associated resistors associated with a second one of said active circuits, said different nominal resistances configured to establish different divided voltage levels at separate ports of said photomultiplier.

3. The voltage divider of claim 1 said voltage divider comprising an associated one of said active circuits configured to provide an associated one of said divided voltages to each port of said photomultiplier.

4. The voltage divider of claim 1, wherein each of said plurality of active circuits each further comprises at least one capacitor, wherein each of said capacitors is configured to provide a port voltage to said photomultiplier.

5. The voltage divider of claim 1, wherein a first one of said plurality of active circuits is configured to be coupled between a cathode and a focusing grid port of said photomultiplier, a second one of said plurality of active circuits is configured to be coupled between said focusing grid port and a first dynode of said photomultiplier, each of a first group of said active circuits is configured to be coupled between each of a first group of dynodes of said photomultiplier, and each of a second group of said active circuits is configured to be coupled between each of a second group of dynodes of said photomultiplier.

6. The voltage divider of claim 5, wherein said first one of said plurality of active circuits and said second one of said plurality of active circuits are configured to provide a divided voltage greater than a divided voltage provided by each one of said first group of said active circuits.

7. The voltage divider of claim 5, wherein each one of said second group of said active circuits is configured to provide a divided voltage greater than said divided voltage provided by each one of said first group of active circuits.

8. The voltage divider of claim 7, wherein a first one of said second group of said active circuits is configured to provide a divided voltage greater than a second one of said second group of said active circuits.

9. A scintillation detection system, comprising:
   a scintillation crystal;
   a photomultiplier in optical communication with said scintillation crystal;
   a voltage divider coupled to said photomultiplier, said voltage divider comprising:
      a plurality of active circuits, each of said active circuits comprising:
         at least one associated resistor configured to establish an associated divided voltage for said active circuit; and
         at least two transistors configured to supply a first port voltage to said photomultiplier, wherein said first port voltage is based on said associated divided voltage; and
   an analyzer coupled to said photomultiplier.

10. The scintillation detection system of claim 9 wherein a first one of said associated resistors associated with a first one of said active circuits has a different nominal resistance than a second one of said associated resistors associated with a second one of said active circuits, said different nominal resistances configured to establish different divided voltage levels at separate ports of said photomultiplier.

11. The scintillation detection system of claim 9, wherein said voltage divider comprises an associated one of said active circuits configured to provide an associated one of said divided voltages to each port of said photomultiplier.

12. The scintillation detection system of claim 9, wherein each of said plurality of active circuits each further comprises at least one capacitor, wherein each of said capacitors is configured to provide a port voltage to said photomultiplier.

13. The scintillation detection system of claim 9, wherein a first one of said plurality of active circuits is configured to be coupled between a cathode and a focusing grid port of said photomultiplier, a second one of said plurality of active circuits is configured to be coupled between said focusing grid port and a first dynode of said photomultiplier, each of a first group of said active circuits is configured to be coupled between each of a first group of dynodes of said photomultiplier, and each of a second group of said active circuits is configured to be coupled between each of a second group of dynodes of said photomultiplier.

* * * * *